: # 2,906,768

METHOD OF REACTING HALOSILANES WITH DIOLS

Loren A. Haluska, Midland, Mich., assignor to Dow Corning Corporation, Midland, Mich., a corporation of Michigan No Drawing. Application December 5, 1957
Serial No. 700,745

2 Claims. (Cl. 260—448.8)

This invention relates to a method of preparing hydroxylated alkoxy derivatives of silanes.

It is well known that alcohols react with chlorosilanes to give alkoxy silanes and a hydrogen halide. With monohydric alcohols this reaction provides no particular problem. However, attempts to prepare diol silane esters in which one of the hydroxyls is still present in the ester from polyfunctional halosilanes has heretofore presented a difficult problem. One way to avoid the difficulty is to first convert the halosilane into an alkoxy silane (such as an ethoxy or methoxy silane) and then to run an ester interchange between the alkoxy silane and the diol. Whereas this method is feasible, it is expensive in that it involves first the preparation of the alkoxy silane.

It is the object of this invention to provide an economical method of reacting a halosilane directly with a diol without the formation of gels.

Another object of this invention is to provide water-soluble organosilicon compounds. Other objects and advantages will be apparent from the following description.

In accordance with this invention a compound of the formula $R_nSi(OR'OH)_{4-n}$ in which R is of the group monovalent hydrocarbon radicals or halogenated monovalent hydrocarbon radicals, R' is a divalent aliphatic hydrocarbon radical or a divalent aliphatic hydrocarbonoxy radical in which the oxygen is in the form of ether linkages, and $n$ has a value from 1 to 3 inclusive, is prepared by adding a halosilane of the formula $R_nSiX_{4-n}$ where X is a halogen having an atomic weight ranging from 30 to 130 and R and $n$ are as above defined, beneath the surface of a diol of the formula HOR'OH where R' is as above defined, under subatmospheric pressure whereby the HX is removed as it is formed, the relative amounts of halosilane and diol employed being such that there is at least 2.1 diol OH per silane-halogen atom.

The crux of the present invention is applicant's discovery that excellent yields of the products of this invention can be obtained when the halosilane is added beneath the surface of the diol under conditions of subatmospheric pressure. This causes the hydrogen halide formed during the reaction to be removed immediately thereby avoiding undesirable side reactions. These side reactions can cause gelation of the product and thereby reduce the yield.

The reaction can be carried out at any temperature ranging from below 0° C. up to any convenient temperature. Obviously the temperature-pressure relationship should be such that the reactants are not excessively removed from the reaction zone.

The diol should be employed in excess such that there is at least 2.1 diol hydroxyls per silane-halogen atom. In other words, the number of molecules of diol exceeds the number of halogen atoms by at least 5%. Thus, if one were reacting 1 mol methyltrichlorosilane there should be at least 3.15 mols of, for example, ethylene glycol.

In the operation of the process of this invention any silane of the formula $R_nSiX_{4-n}$ in which R is any monovalent hydrocarbon radical or halogenated monovalent hydrocarbon radical and X is chlorine, bromine or iodine can be employed.

Specific examples of R radicals which are operative herein are alkyl radicals such as methyl, ethyl, octadecyl and myricyl; alkenyl hydrocarbon radicals such as vinyl, hexenyl and octadecenyl; cycloaliphatic hydrocarbon radicals such as cyclopentyl, cyclohexyl and cyclohexenyl; alkaryl hydrocarbon radicals such as benzyl and β-phenylethyl; aromatic hydrocarbon radicals such as phenyl, xenyl, naphthyl, anthracyl and tolyl; halogenated monovalent hydrocarbon radicals such as chloromethyl, bromophenyl, pentafluorobutyl, chlorotrifluorocyclobutyl, α,α,α-trifluorotolyl, iodoxenyl and trifluorovinyl.

For the purpose of this invention any diol in which R' is any divalent aliphatic hydrocarbon radical, or any divalent aliphatic hydrocarbonoxy radical can be employed in the method of this invention. Specific examples of such diols are ethylene glycol, propylene glycol, butylene glycol, 1,2-hexanediol, 1,6-hexanediol and octadecamethylene glycol; and unsaturated glycols such as $HO(CH_2)_3CH=CH(CH_2)_3OH$. The diols can also be polyglycols containing ether linkages such as diethylene glycol, triethylene glycol, octaethylene glycol and dodecaethylene glycol.

In carrying out the process of this invention the depth beneath the surface of the glycol at which the halosilane is admitted is not critical. It is preferable that the reaction mixture be agitated during the reaction in order to insure thorough mixing of the reactants.

The materials prepared by the method of this invention are useful as water repellents, release agents, and as ingredients in cosmetics.

The following examples are illustrative only and should not be construed as limiting the invention which is properly delineated in the appended claims.

Example 1

The reaction vessel was loaded with 6028.8 g. of ethylene glycol. The vessel was placed under a partial vacuum of 10 inches and 3576 g. of methyltrichlorosilane was added over a period of 3 hours. The chlorosilane was added through a tube beneath the surface of the glycol. During the addition the temperature ranged from 24 to 64° C. and the gage pressure from 10 to 22 inches. After addition was complete the mixture was heated at 100 to 119° C. for 1½ hours at a gage pressure of 22 inches. The resulting product was then treated with ethylene oxide to remove the last traces of silicon-bonded chlorine.

The resulting product was a neutral, water-soluble material having the average formula $$MeSi(OCH_2CH_2OH)_3$$

Example 2

163.5 g. of ethyltrichlorosilane was added beneath the surface of 443.9 g. of diethylene glycol. During addition a reduced pressure of from .5 to 1.5 inches of mercury was maintained and the temperature of the reaction was from 28 to 48° C. The chlorosilane was added over a period of 1 hour and the mixture was thereafter heated at 113° C. for 1 hour at a pressure of .3 inch of mercury. The resulting product was neutralized with ethylene oxide and then heated at 124° C. at 1.74 mm. of mercury to give 375 g. of the product $$EtSi(OCH_2CH_2OCH_2CH_2OH)_3$$

This product was water soluble and was useful in rendering masonry water repellent.

Example 3

177.6 g. of n-propyltrichlorosilane was added beneath the surface of 969.2 g. of triethylene glycol. During addition a reduced pressure of 29 inches gage was maintained and the temperature ranged from 24.5 to 41° C. The chlorosilane was added over a period of 33 minutes and the reaction mixture was then heated to 133° C. at a pressure of 29.5 inches gage. The product was neutralized with ethylene oxide and then strip distilled to 156° C. at 2.4 mm. of mercury to give a water soluble residue of the formula $PrSi[(OCH_2CH_2)_3OH]_3$.

Example 4

When 1 mol of dimethyldibromosilane is reacted with 2.5 mols of ethylene glycol in accordance with the procedure of Example 1, the composition $$Me_2Si(OCH_2CH_2OH)_2$$

is obtained.

Example 5

When 1 mol of trimethylchlorosilane is reacted with 2 mols of ethylene glycol in accordance with the procedure of Example 1, the compound $Me_3Si(OCH_2CH_2OH)$ is obtained.

Example 6

When 1 mol of the following halosilanes is reacted with 3.5 mols of the following glycols in accordance with the procedure of Example 1, the following reaction products are obtained.

| Halosilane | Glycol | Reaction product |
|---|---|---|
| Phenyltrichlorosilane | Propylene glycol | PhSi(OCH$_2$ĊHOH)$_3$ with Me |
| Vinyltrichlorosilane | 1,6-hexane diol | ViSi[O(CH$_2$)$_6$OH]$_3$ |
| Octadecyltrichlorosilane | Neopentyl diol | C$_{18}$H$_{37}$Si(OCH$_2$ĊCH$_2$OH)$_3$ with Me$_2$ |
| Phenylmethyldichlorosilane | Ethylene glycol | PhMeSi(OCH$_2$CH$_2$OH)$_2$ |
| 3,3,3-trifluoropropyltrichlorosilane | Octaethylene glycol | F$_3$CCH$_2$CH$_2$Si[(OCH$_2$CH$_2$)$_8$OH]$_3$ |
| Chloromethyltrichlorosilane | Ethylene glycol | ClCH$_2$Si(OCH$_2$CH$_2$OH)$_3$ |
| Bromophenyltribromosilane | do | Br-C$_6$H$_4$-Si(OCH$_2$CH$_2$OH)$_3$ |
| α,α,α-trifluorotolyltrichlorosilane | do | F$_3$C-C$_6$H$_4$-Si(OCH$_2$CH$_2$OH)$_3$ |
| Cyclohexyltriiodosilane | do | C$_6$H$_{11}$-Si(OCH$_2$CH$_2$OH)$_3$ |

That which is claimed is:

1. A method of preparing compounds of the formula $R_nSi(OR'OH)_{4-n}$ in which R is selected from the group consisting of monovalent hydrocarbon radicals or halogenated monovalent hydrocarbon radicals, R' is selected from the group consisting of divalent aliphatic hydrocarbon radicals and divalent aliphatic hydrocarbonoxy radicals in which the oxygen is in the form of ether linkages, and n has a value from 1 to 3 inclusive, which comprises adding a halosilane of the formula $R_nSiX_{4-n}$ where X is a halogen atom having an atomic weight ranging from 30 to 130 and R and n are as above defined, beneath the surface of a diol of the formula HOR'OH where R' is as above defined under subatmospheric pressure whereby the HX is removed as it is formed, the relative amounts of halosilane and diol employed being such that there is at least 2.1 diol OH per silane-halogen atom.

2. The method in accordance with claim 1 where R is methyl and the diol is ethylene glycol.

References Cited in the file of this patent

FOREIGN PATENTS

| | | |
|---|---|---|
| 162,927 | Australia | Apr. 25, 1949 |
| 936,038 | Germany | Dec. 1, 1955 |

OTHER REFERENCES

Emeleus et al.: "Modern Aspects of Inorganic Chemistry," Van Nostrand Co., Inc., New York, publishers (1952), pp. 396–7.